United States Patent [19]  [11] 4,075,665
Borne et al.  [45] Feb. 21, 1978

[54] METHOD AND APPARATUS FOR INCREASING THE RECORDING CAPACITY OF A DISK

[75] Inventors: Jean Paul Borne, Saint-Maur; Geert Jan Naaijer, Limeil-Brevannes, both of France

[73] Assignee: U.S. Philips Corporation, New York, N.Y.

[21] Appl. No.: 703,302

[22] Filed: July 7, 1976

[30] Foreign Application Priority Data

July 9, 1975 France .............................. 75 21530

[51] Int. Cl.² ............................................. G11B 5/012
[52] U.S. Cl. .............................................. 360/8; 360/55
[58] Field of Search ............................... 360/8, 25, 55

[56] References Cited
U.S. PATENT DOCUMENTS

| 3,334,193 | 8/1967 | Dow | 360/8 |
| 3,789,137 | 1/1974 | Newell | 360/8 |
| 3,860,760 | 1/1975 | Rittenbach | 360/8 |
| 3,869,708 | 3/1975 | Schiffman | 360/8 |
| 3,878,560 | 4/1975 | Ramage | 360/8 |

Primary Examiner—Jay P. Lucas
Attorney, Agent, or Firm—Frank R. Trifari; Simon L. Cohen

[57] ABSTRACT

A method of recording and reproducing audio information on a disc shaped record carrier. During recording the audio information is divided into consecutive information segments of a duration $\tau_t$. Each information segment is subjected to time compression before recording. The duration $\tau_t$ and the time compression are selected so that optimum use is made of the recording capacity of the record carrier without information loss. During reproduction the information segments are subjected to a complementary time expansion and recombined in their original sequence.

21 Claims, 11 Drawing Figures

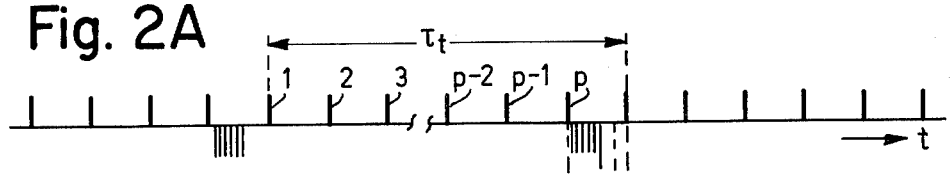
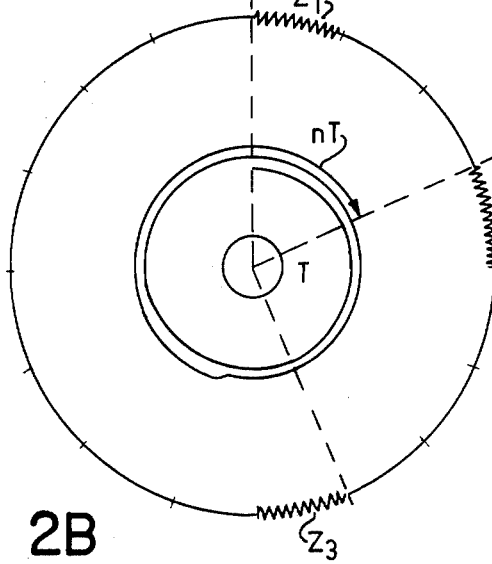
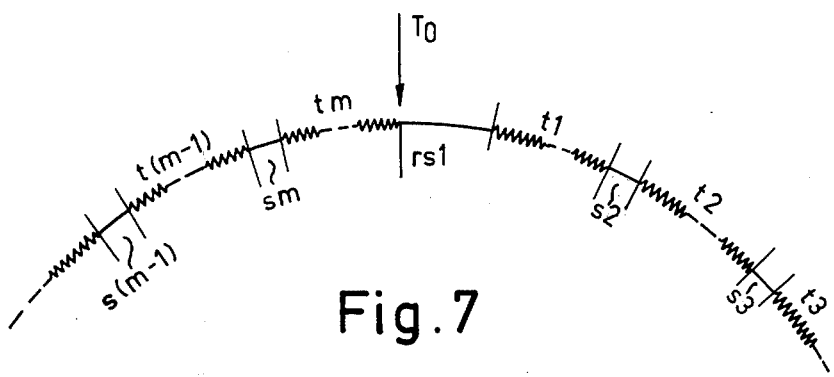
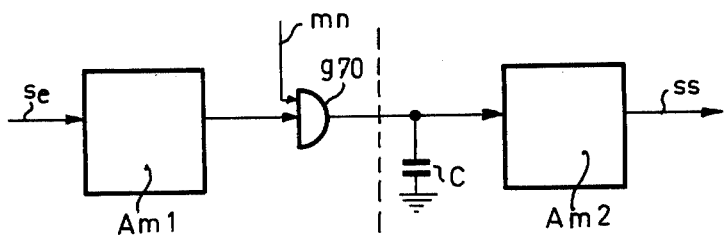

METHOD AND APPARATUS FOR INCREASING THE RECORDING CAPACITY OF A DISK

The invention relates to a method of recording and reproducing $x$ audio informatin signals, $x$ being an integer, on a disc-shaped record carrier which is driven with a substantially constant speed of revolution V and which co-operates with a write and read head. During recording each of the information signals is divided into consecutive information segments of equal duration, $\tau_t$, each information segment being subjected to a time compression in that it is sampled and the resulting samples are read into a memory with a sampling and first clock frequency $f$, which is at least twice the maximum frequency of the information, after which this stored group of samples is read out of this memory with a second clock frequency F, which is greater than the first clock frequency $f$ and is recorded on the record carrier as a group. During reproduction each of the information segments is subjected to a complementary time expansion in that each read-out group is read into a memory with the second clock frequency F and is read out of this memory with the first clock frequency $f$.

In recent years much interest is taken in disc-shaped record carriers which are suitable for recording video information, inter alia magnetic discs and optically readable video discs. Recording and reproducing equipment for record carriers of this type is adapted to enable video information to be recorded and reproduced in an optimum manner. Since video information has a comparatively large bandwidth, this restricts the total playing time of the record carrier, because this makes it inter alia necessary that the speed of the record carrier should be greater than a specific value.

If information with a substantially smaller bandwidth, such as audio information, is to be recorded in a track of such a record carrier using the existing system which is intended for video information, optimum use of the record carrier is certainly not achieved, because the playing time of the record carrier is then still determined by the bandwidth of the video information.

In principle, there are two possibilities of improving this. The first possibility is to reduce the speed of the record carrier. Generally, this is less desirable because of the consequences for the read apparatus. Moreover, it would then no longer be possible for example to alternately record audio and video information on the record carrier. The second possibility is the use of time compression when the signal is recorded and a complementary time expansion when this signal is reproduced. For this purpose, the information is divided into consecutieve information segments, and each information segment is subjected to time compression during recording and to time expansion during reproduction.

It is an object of the invention to provide a method of recording and reproducing information on a disc-shaped record carrier, making optimum use of time compression and time expansion in combination with the character of the record carrier.

The invention is therefore characterized in that the radial position of the write or read head is controlled by a translation control unit and that the two clock frequencies f and F are synchronized relative with the speed of revolution V of the record carrier, that the magnitude of the frequencies f and F and the magnitude of the duration $\tau_t$ of the information segments is selected in such a way that $\tau t \leq F/f^2$, and that for the time interval $\tau_i$ during which each information segment is actually recorded on the record carrier the expression $\tau_t f/F \leq \tau_i \leq 1/f$ is valid.

The invention is based on the recognition that by the choice of the time $\tau_t$ the division into information segments affects the information to the smallest possible extent, while the synchronization of the clock frequencies $f$ and F with the speed of revolution V of the record carrier ensures that the compressed information segments can be recorded on this record carrier in a fixed pattern.

In accordance with a further characteristic feature of the invention, characterized in that the duration $\tau_t$ of one information segment satisfies the equation $\tau_t = N1/V + a/m \cdot 1/V$, N being an integer with the inclusion of zero, $a$ being a multiple of $x$ which is smaller than $m$, and $m = 1/V$ being the number of groups per track circumference and also being a multiple of $x$, while the parameters $a$ and $m$ are selected so that $a/x$ and $m/x$ have no common divisor. Thus, it is achieved that compressed information segments which are recorded on the record carrier in a sequence of groups completely utilize the space available on this record carrier.

If the record carrier has circular tracks, this means that in one track $m$ groups are recorded in such a way that the full track circumference is utilized by these $m$ groups. The same applies to a spiral track, one track circumference being the track portion corresponding to one revolution of the record carrier.

In order to proceed with the next track circumference after a track circumference has been recorded or reproduced completely a translation of the write head or read head is necesssary. This translation is effected with the aid of a translation control unit.

In accordance with a further characteristic feature of the invention this translation control unit can be controlled, characterized in that the translation control unit is controlled by a group counter which during recording counts the numner of groups already recorded in one track circumference, and during reproduction counts the number of groups already read out of one track circumference, and which, depending on the choice of the parameters, supplies command signals to the translation control unit at specific counts, so as to cause a translation of the write or read head.

In accordance with a further characteristic feature of the invention this translation control unit may alternatively be controlled by a revolution counter, which counts the number of revolutions of the record carrier after the beginning of the recording or read-out of one track circumference, and depending on the choice of the parameters supplies command signals to the translation control unit at specific counts, so as to cause a translation of the write or read head.

In accordance with a further feature of the invention it is possible to add a synchronizing signal to each information group and a marking signal to each first group of a track circumference. During reproduction this enables the read-in and read-out intervals of the memory during the time expansion to be defined with the aid of these synchronizing signals, so that timing errors, for example owing to an eccentricity of the disc, have no significant effect. During reproduction, the marking signal can moreover be used in a simple way for synchronizing the two clock frequencies relative to the speed of revolution of the record carrier.

The invention will be described in more detail with reference to the drawings, in which FIG. 1 shows a first embodiment of an apparatus for carrying out the method in accordance with the invention, destined for one information signal.

FIG. 2a shows a time diagram, FIG. 2b a circular track with information groups, and FIG. 2c a table to clarify the operation of the apparatus of FIG. 1.

FIG. 5 shows an embodiment of a recording apparatus for recording one information signal, in which marking and synchronizing are added to the groups, while

Figure 6:
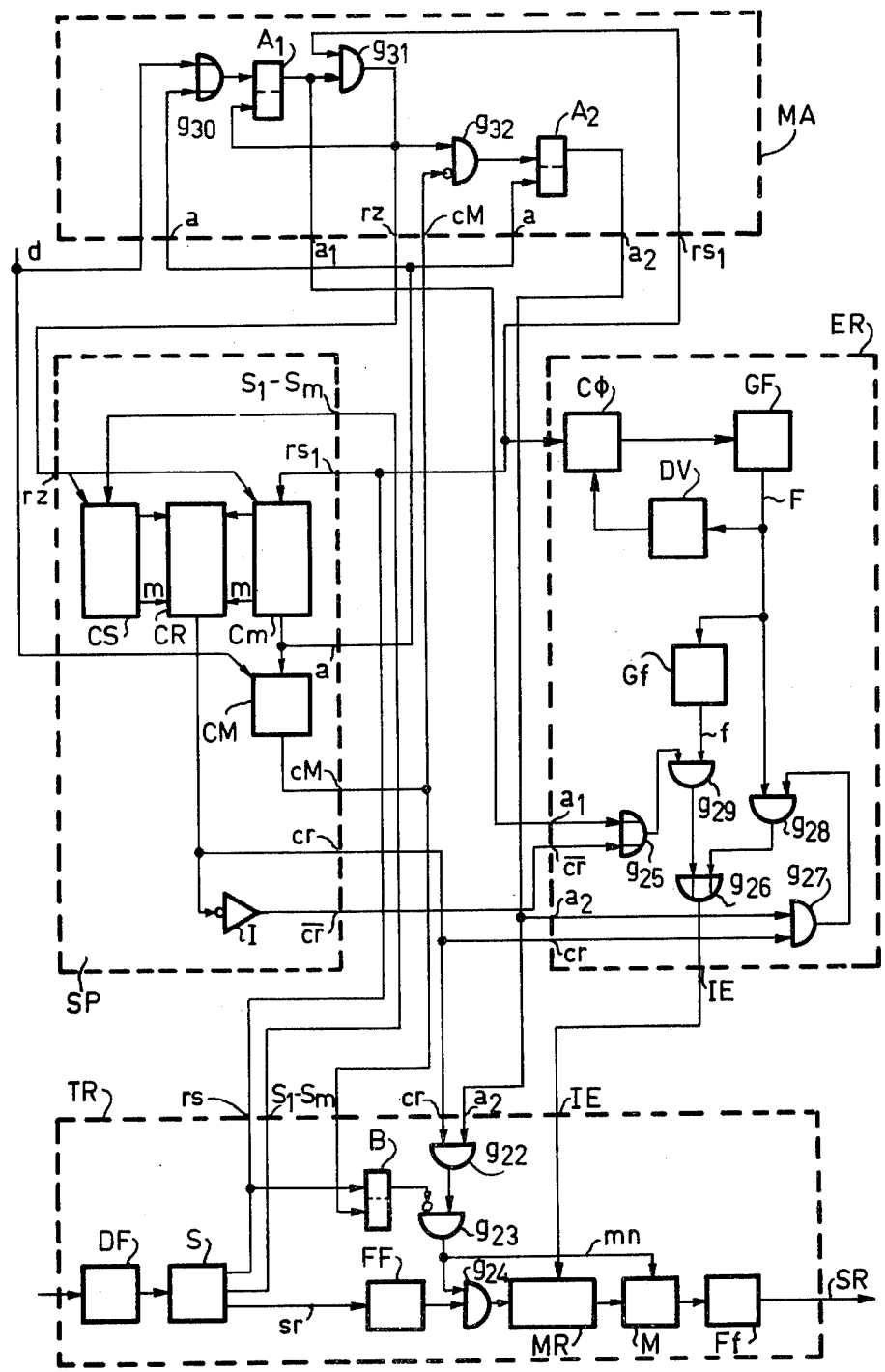
FIG. 6 shows an embodiment of the corresponding reproducing apparatus.

FIG. 7 schematically shows the subdivision of one track sector, provided with information groups, a marking signal and synchronizing signals, FIG. 8 finally shows an embodiment of the hold circuit shown in FIG. 6.

Figure 1:
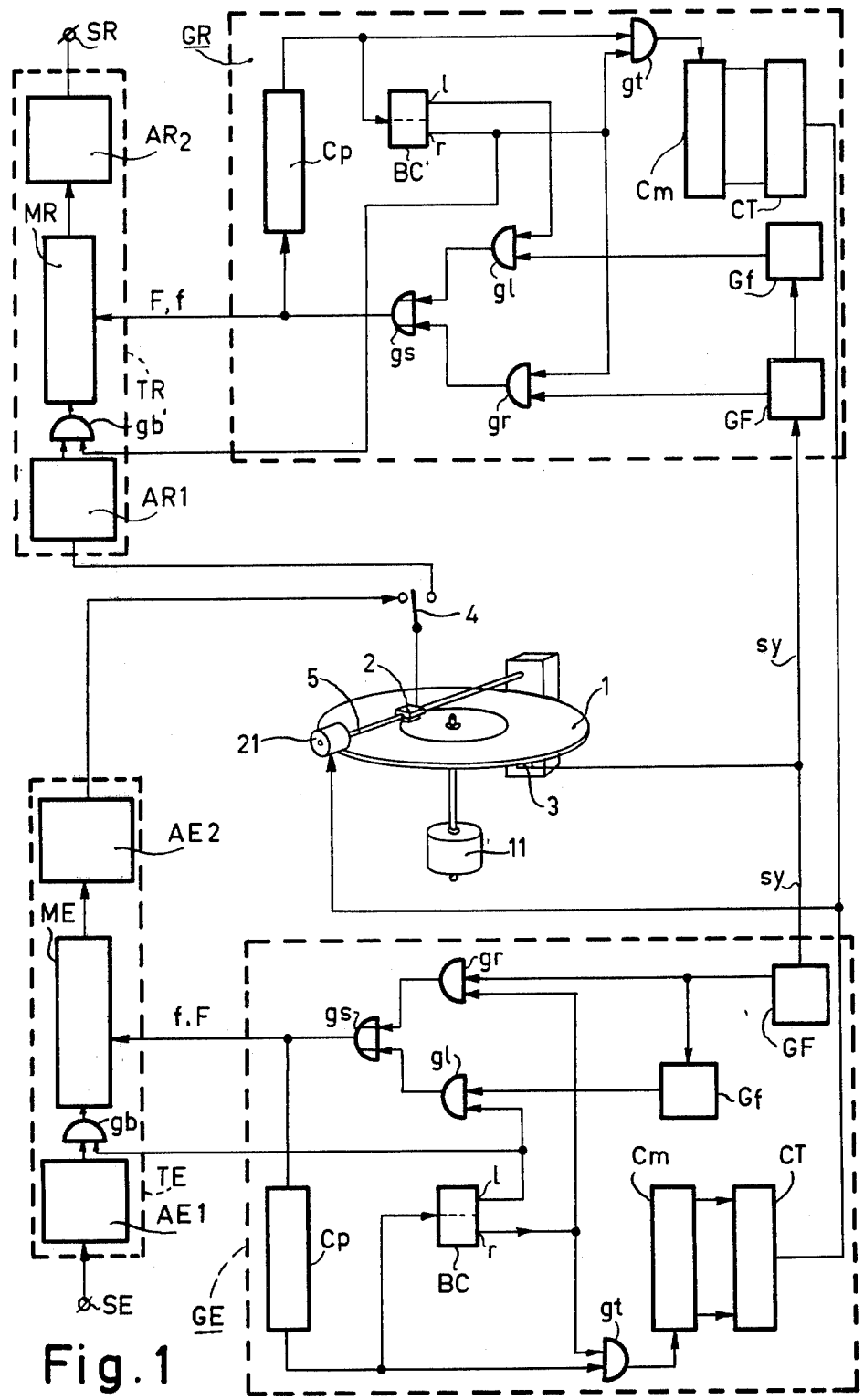

FIG. 1 schematically shows the construction of the system in accordance with the invention, destined for one information signal, in particular the recording and reproducing apparatus. For the sake of simplicity only the principal components are shown.

As the record carrier a magnetic disc 1 is shown by way of example, which disc is driven by a motor 11. For recording and reproducing the information a write/read head 2 is mounted on a lead screw 5. With the aid of the motor 21, for example a stepping motor, said lead screw can be driven so that the write/read head 2 can be moved over the disc 1 in a radial direction. Furthermore, a transducer 3 is shown, which supplies a signal which is a measure of the speed of the magnetic disc 1. The transducer may be of any known type, for example optical or magnetic.

The recording apparatus comprises two sections, namely a signal circuit TE and a control circuit GE. The signal to be recorded SE is applied to an input terminal of the circuit TE, which in this order comprises an adaptation circuit AE1, a memory ME and an adaptation circuit AE2. The memory ME may be of any known type, such as an analog or digital shift register. The choice of the memory dictates the type of adaptation circuit AE1 to be used. For example, when a digital shift register is used this adaptation circuit AE1 should inter alia comprise an analog-digital converter. The type of adaptation circuit AE2 is determined both by the choice of the memory ME and by the type of record carrier which is used. This adaptation circuit AE2 converts the output signal of the memory ME into a form which is suitable for recording on the record carrier 1. As an example, this adaptation circuit AE2 may comprise a low-pass filter with a cut-off frequency smaller than Fmax, which reconverts the group of samples into a continuous signal, which for example is moreover frequency modulated. When the switch 4 is in the position shown, the output signal of this adaptation circuit AE2 is supplied to the write-read head 2. Hereinafter, it is assumed that the memory ME is an analog shift register with p memory elements, which is consequently capable of storing p samples of the signal to be recorded.

The control circuit GE both serves to control the signal circuit TE, in particular to supply the clock signal to the memory ME, and to control the translation of the write/read head 2 via the motor 21.

This control circuit GE first of all comprises a generator GF, which supplies a pulse train with a repetition frequency F, i.e. with time intervals $\tau_F = 1/F$. This generator GF is synchronized with the speed V of the record carrier 1 by the signal SY supplied by the transducer 3. The second generator Gf supplies a pulse train with the repetition frequency $f$, i.e. with time intervals $\tau_f = 1/f$. The frequency $f$ preferably selected so that it is a multiple of the speed V (revolutions per second) of the record carrier 1. If this frequency $f$ is moreover selected to be a fraction of the frequency F, this second generator Gf may take the form of a frequency divider stage which derives the pulse train of the frequency $f$ from the pulse train of the frequency F by frequency division.

The pulse trains supplied by the generators GF and Gf are each individually applied to an AND gate gr and gl respectively, whose outputs are connected to an OR-gate gs. The output signal of this OR-gate gs is both applied to the memory ME as a clock signal, and to a counting circuit Cp. This counting circuit Cp is adapted to generate one counting pulse at its output each time after counting p pulses at its input. This counting pulse is applied to the input of a bistable multivibrator BC, whose state is changed by every pulse at its input. A first input 1 of this multivibrator BC is connected to the AND-gate gl and a second output r, which always carries the inverse signal of the first output 1, is connected to the AND-gate gr. Furthermore, this output r of the multivibrator BC is connected to a first input of an AND-gate gt, of which a second input is connected to the output of the counting circuit Cp. This AND-gate gt in its turn controls a counting circuit Cm, which is coupled to a control unit CT, which eventually supplies the control signal for the motor 21.

As previously stated, the information is recorded in accordance with a sequence of cycles, each cycle comprising two periods, namely a read-in period in which p samples of the information to be recorded are read into the memory ME, and a read-out period in which the samples stored in the memory ME are read out of the memory and are recorded on the record carrier 1 via the adaptation circuit AD$_2$. The p samples are read into the memory with the clock frequency $f$ and these p samples are read out of the memory with a clock frequency F, which is greater than the frequency $f$, so that the desired time compression is obtained.

In order to explain how such a cycle is obtained, it is assumed that the multivibrator BC is in the state in which its output 1 supplies a logic 1 and its output $t$ consequently a logic 0. This means that the AND-gate gr does not transfer the pulse train of the frequency F applied to it, while the pulse train of the frequency $f$ is transferred by the AND-gate gl, that it is consequently applied to the memory ME as a clock signal via the OR-gate gs. As a result, the applied information SE is sampled with a sampling frequency $f$, these samples being consecutively stored in the memory ME. The pulse train which functions as a clock signal for the memory ME, is also applied to the counting circuit Cp, which after counting $p$ pulses supplies a pulse to the multivibrator BC, so that the state of the multivibrator changes and consequently the read-in period of the memory ME, in which at that instant exactly p samples of the information SE are stored, is terminated. At this instance the signal at the output 1 of the multivibrator BC becomes a logic 0, so that the AND-gate gl is blocked and the output r becomes a logic 1 and the AND-gate gr transfers the pulse train applied to it. The clock signal for the memory ME is now the pulse train of the frequency F, so that the p samples stored in the memory are read out with this clock frequency F and applied to the adaptation circuit $A_2$. Simultaneously this clock signal of the frequency F is also applied to the counting circuit $C_p$, which after counting p pulses i.e. at the instant that all the p samples have been read out of the memory, supplies a pulse to the multivibrator BC, so that the state of this multivibrator changes again and the read-in period of the next cycle commences.

In order to prevent the simultaneous read-in of new information samples during the read-out period of the memory ME, an AND-gate gb has been included between the adaptation circuit AE1 and the memory ME, which gate is also connected to the output 1 of the multivibrator BC. Thus, it is ensured that the signal appears at the input of the memory during the read-in period only. It is evident that this provision may also be automatically included in the organization of the memory ME, or is provided at the output.

In order to enable the translation of the write/read head to be controlled in a suitable manner a pulse is aplied to the counter Cm each time that a cycle is terminated, for which purpose an AND-gate gt is provided, which is connected to the output of the counter Cp and to the output r of the multivibrator BC. This counter Cm then controls the control unit CT, which depending on the track geometry of the record carrier and other system parameters derives the control signal for the motor 21 from this. This translation control will be described in more detail hereinafter.

The reproducing apparatus is largely identical to the recording apparatus and again comprises a signal circuit TR and a control circuit GR. The signal circuit TR in a corresponding manner comprises the signal circuit TE, an adaptation circuit AR1, a memory MR with p memory elements, and an adaptation circuit AR2. During reproduction of the information which is recorded on the record carrier 1 the switch 4 is set to the right-hand position, so that the recorded signal is applied to the adaptation circuit AR1 and after processing is available at an output terminal of the signal circuit TR as the information SR.

With one exception the structure of the control circuit GR is fully identical to that of the control circuit GE of the recording apparatus. This exception concerns the control of the AND-gate gb' which has been included as a blocking circuit between the adaptation circuit AR1 and the memory circuit MR in the signal circuit TR. This AND-gate gb' is now connected to the output r of the multivibrator BC'. Thus it is ensured that the clock frequencies which are effective during the read-in period and the read-out period of the memory MR are exactly interchanged in comparison with the situation during recording. Sampling of the signal which is read from the record carrier by the write-read head in the memory MR is now effected by the pulse train with a frequency F as a clock signal, while read-out of these p samples from this memory MR is effected by the pulse train with the lower frequency $f$. Thus, it is evident that the duration of the information is expanded to its original value.

As described previously, the division of the information into groups of p samples, each group being compressed in time, allows memories ME and MR of comparatively low capacity to be used. It is obvious that certain requirements should be met so as to prevent loss of information. Moreover, in order to make optimum use of the recording capacity of the record carrier, the translation of the write/read head should take place in a correct manner, said translation being obviously dependent on the shape of the information track, which may consist of concentric circles or of a spiral. These aspects will be discussed hereinafter.

First of all the relationship between the magnitude of the frequencies $f$, F, the speed V of the record carrier, and the number of groups m of p samples recorded in one track circumference of the record carrier will be considered with reference to FIG. 2a. In this respect track circumference is to be understood to mean the length over which one track extends per revolution of the record carrier. As previously stated, the sampling frequency $f$ should equal at least twice the maximum frequency $f_{max}$ of the information to be recorded, i.e. $f \geq f_{max}$. The frequency F, i.e. the frequency of the samples recorded on the record carrier, should be smaller than the maximum frequency $F_{max}$ which the recording and reproducing apparatus can handle, so that $F \leq F_{max}$. Thus, limits are set for the frequencies f and F. Hereinafter it is assumed that the frequencies f and F are selected so that these two requirements are met.

On the time axis t in FIG. 2a a number of sampling pulses with a repetition frequency $f$ are shown, i.e. with a period $\tau_f = 1/f$. If a group of p samples is read into the memory ME, this group of p samples represents a duration $\tau_t$ of the information equal to $\tau_t = p\tau_f$. After time compression by the read-out from the memory ME with the higher frequency F, this group of p samples covers a duration equal to $p\tau_F$, where $\tau_F' = 1/F$. If the time interval during which information is recorded on the record carrier in one cycle is defined as $\tau_i$, $\tau_i$ should meet two requirements. First of all $\tau_i \geq p \tau_F$, in order that all the sample present in the memory ME are actually recorded. A second requirement is that $\tau_i \leq \tau_f$, to ensure that recording of the relevant group is completed before the occurrence of the first sample of the next group of samples. Hence, for this time interval $\tau_i$ the relation p $\tau_F \leq \tau_i \leq \tau_f$(1) is valid.

It is to be noted that in the embodiment shown in FIG. 1 $\tau_i$ automatically equals p $\tau_F$, because with the aid of the counting circuit CP change over to read-in takes place immediately after the last sample has been read out of the memory ME. However, in the case that p $\tau_F$ is smaller than $\tau_f$ (see FIG. 2a), it is possible to utilize the remaining time interval to record additional information, such as synchronizing signals, marking signals etc. In that case $\tau_i$ is consequently greater than $p\tau_F$.

From formula (1) it follows that p $\tau_F \leq \tau_f$. From this it follows for the duration $\tau_t$ of one group of samples that $$\tau_t = p\tau_f \leq \tau_f \frac{\tau_f}{\tau_F} \tag{2}$$

When it is assumed that $\tau_t = nT$, n being an arbitrary number and $T = 1/v$ being the recolution period of the record carrier, it follows from (2) that $$n \leq \frac{\tau_f}{T} \cdot \frac{\tau_f}{\tau_F} \tag{3}$$

Thus, the maximum duration of one group is defined in function of the system parameters $\tau_f$, $\tau_F$ and T.

In order to provide an insight into these parameters a numerical example is given. Assume that V = 40 revolutions per second, i.e. T = 25 msecs. F = 5 MHz, i.e. $\tau_F$ = 0.2 μsecs, and F = 10 KHz, i.e. $\tau_f$ = 100 μsecs. It then follows from formula (3) that $n \leq 2$, i.e. $\tau_t \leq 2.25$ msecs = 50 msecs. For the number of samples p per group it follows from (3) that $p \leq 500$. The number of groups m which is recorded per track of the record carrier is $m = T/f = 250$.

Thus, the conditions are defined under which no information is lost during recording of the information. An important object is also to utilized the space available on the record carrier in the most effective manner. This will be the case if the groups of samples are uniformly recorded in the tracks, i.e. without unused intervals. This results in additional requirements for the system parameters, as will be demonstrated hereinafter with reference to FIG. 2b. This Figure is based on the situation that in the formula $\tau_t = nT$, n is greater than 1, i.e. that the duration of a group of information samples is greater than the duration T of one revolution of the record carrier. Furthermore, a circular track is shown for the sake of simplicity. However, what is stated hereinafter with respect to the division of the group equally applies to a spiral track.

It is assumed that m groups are recorded per track. In the case of a circular track m is necessarily an integer, which is assumed hereinafter. In the case of a spiral track, however, this is not necessarily so. Furthermore, the duration $\tau_t$ of a group of information samples is written as $$\tau_t = nT = NT + \frac{a}{m} T \quad (4)$$

where N is an integer and a is an integer smaller than m and greater than 0, i.e. $1 \leq a < m$. If it is assumed that the first group $Z_1$ is recorded at the initial position represented by the instant $T_1$, the next group $Z_2$ will be recorded at the initial position represented by $T_2$, for which the following expression is valid:

$$T_2 = T_1 + NT + \frac{a}{m} T$$

The initial positions of the consecutive groups $Z_1$ through $Z_{m+1}$ may consequently be characterized in a manner as indicated in the table of FIG. 2c.

In respect of its position along the circumference the group $Z_{m+1}$ should coincide with the group $Z_1$. This group $Z_{m+1}$ is the first group to be recorded on the next track of the record carrier. From the expression for $T_{m+1}$ it follows that this is automatically so. This is because $T_{m+1} = T_1 + m(NT + a/m\ T) = T_1 + mNT + aT = T_1 + M(1)\ T$, where M(1) represents a multiple of 1, because the parameters m, N and a are all integers.

However, to enable the available space to be utilized, it is also necessary that none of the m groups per track coincides with a preceding group in respect of its position on the track. This yields the following set of $(m-1)$ conditions:

$$T_2 \neq T_1 + M(1)T \quad (5)$$

$$T_3 \neq T_1 + M(1)T$$

$$T_m \neq T_1 + M(1)T$$

Insertion of the expressions of the Table of FIG. 2c then yields $$NT + \frac{a}{m} T \neq M(1)T \quad (6)$$

$$2(NT + \frac{a}{m} T) \neq M(1)T$$

$$\vdots$$

$$(m - 1)(NT + \frac{a}{m} T) \neq M(1)T$$

Since N is an integer it follows that $$\frac{a}{m} \neq M(1) \qquad a \neq M(m)$$

$$2 \cdot \frac{a}{m} \neq M(1) \quad \text{or} \quad a \neq M(\frac{1}{2} m) \quad (7)$$

$$(m - 1)\frac{a}{m} \neq M(1) \qquad a \neq M(\frac{m}{m-1})$$

This last-mentioned set of conditions (7) merely indicates that the numbers a and m should not have a common divisor unequal to 1. In order to achieve an optimum use of the record carrier it is merely necessary that after the number of groups m per track circumference has been selected, the parameter a is selected so that this requirement is met, while it is obvious that the requirement of formula (3) must still be satisfied. A special case occurs if $a = 1$ is chosen. In that case consecutive groups $Z_1$ through $Z_m$ are recorded continuously in this order on a track.

In the case of a circular track, as previously stated, the number of groups m per track must be an integer. With such a track geometry one specific track will generaly be filled completely before proceeding with the next track.

In the case of a record carrier with a spiral track this need not necessarily be so. For such a track $m = T/\tau f \neq M(1)$ may be selected. In that case the condition for a and m changes, while moreover an additional requirement for N should be met. First of all, the time interval $\tau_t$ should be selected so that a whole number of samples p occurs within this time interval. From formula (2) and (4) it follows that:

$$p = \frac{\tau_t}{\tau_f} = \frac{NT + \frac{a}{m} T}{\tau_f} = m(N + \frac{a}{m}) = mN + a \quad (8)$$

Consequently, the requirement $p = mN + a = M(1)$ should be met, i.e. $mN = M(1) \quad (9)$ In this case mN groups are recorded divided over N track circumferences in other words N track circumferences are completely filled with the mN groups in accordance with a specific pattern, before the next set of mN groups is recorded in the next N track circumferences. Therefore, the requirement which is valid for a and m when m(1) is chosen, should now apply to a and mN, which means that a and mN should not have a common divisor.

The control necessary for the translation of the write/read head first of all depends on the shape of the track, which may be either circular or spiral-shaped. Furthermore, the control method obviously depends on the choice of the system parameters, such as N, m and a. Moreover, this control may be realized in two essentially different manners. With the aid of a counting circuit the number of groups of a complete set (m or Nm) may be counted which are to be recorded or read, and the translation may be controlled depending on the count of this group counter. However, alternatively the number of revolutions of the record carrier after recording of the first group has started may be counted with the aid of a counting circuit and translation control may be effected depending on the count of this revolution counter. Hereinafter, a number of possibilities are described of controlling the translational movements depending on the system parameters.

1. CIRCULAR TRACKS

A. Use of a group counter. In this case the translation over one track distance is effected each time after m groups have been counted. This essentially corresponds to the embodiment shown in FIG. 1. The group counter Cm counts the number of groups and upon reaching the count m it supplies a command to the control unit CT, upon which this unit supplies a control signal to the motor 21 for moving the write/read head 2 over one track distance.

B. Use of a revolution counter. In this case a translation over one track distance is effected each time after $(mN + a)$ revolutions have been counted. The time which is required for recording or reading out m groups is $m \tau_t = m(NT + a/m\, T) = T(mN + a)$.

2. SPIRAL TRACK

A. Use of a group counter. The translation now depends on the system parameters. A.a. $a = 1$. A translation over N track distances is effected each time after one group has been counted. A.2. $a \neq 1$ and $m = M(1)$. A translation is effected for any count of the group counter. For counts which are for the first time greater than a multiple of $m/a$ the translation is $N+1$ track distances, for the other counts ($l$ through $m$) the translation is N track distances. Examples: $m = 8$, $a = 3$, hence $m/a = 8/3$. Consequently, a translation over $(N + 1)$ track distances is effected for the counts 3 (3 > 8/3) aand 6 (6 > 16/3), and a translation over N track distances for the other counts 1 through 8. A.3 $a \neq 1$, $m \neq M(1)$. For each count a translation takes place. For counts which for the first time are greater than a multiple of N $m/a$ the translation is 2N track distances, for the other counts (1 through Nm) N track distances. Example m = 10/3, $a = 3$, $N = 3$, hence $N\, m/a = 10/3$. Thus, for the counts 4 (4 > 10/3) and 7 (7 > 20/3) a translation over 6 track distances is effected, for the other counts 1 through 9 a translation over 3 track distances.

B. Use of a revolution counter. In this case the translation also depends on the system parameters. B.1. $a = 1$, $m = M(1)$. For each count of the counter a translation over one track distance takes place, except for one of the highest counts between $\{N(m-1) + 1\}$ and $\{Nm + 1\}$. It is for example also possible to effect a translation over N track distances for each count which is a multiple of N, except for one of the highest counts between mN and $N(mN + 1)$. B.2. $a \neq 1$, $m = M(1)$. For each count of the counter a translation is effected over one track distance, except for one of the highest counts between $\{N(m+1) + a\}$ and $\{Nm + a\}$.

From the above it will be evident that the design of the counting circuit CM and that of the control units CT depends on the system parameters and the selected translational movements. However, once a choice has been made this translation, for which the requirements are specified hereinbefore, can simply be realized with the aid of logic circuits.

The requirements for a and m and the translation derived hereinbefore are based on a time interval $\tau_t = nT$, which is greater than one revolution period T of the record carrier, i.e. $N > 1$. However, n may equally be selected to be < 1. For $\tau_t$ the following expression may then be written:

$$\tau_t = \frac{a}{m}\, T \; (N = 0 \text{ in formula 4}) \tag{10}$$

Figure 3A:
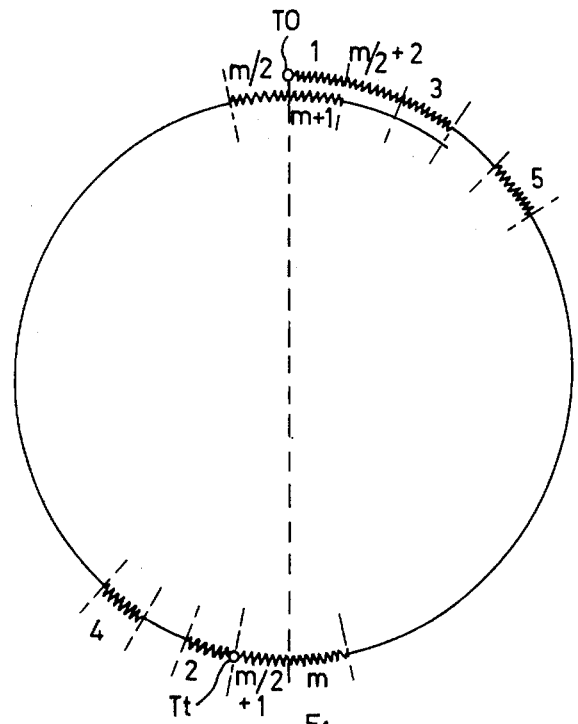
FIGS. 3a and 3b show the distribution of the groups over one track circumference of a spiral track in the case that $a = \frac{1}{2}m + 1$.

In a similar way as for $n > 1$ it can be demonstrated that for a complete use of the record carrier a and m should have no common divisor. FIG. 3a by way of example shows the distribution of the groups over a spiral track in a case that $a = \frac{1}{2}m + 1$. In this case the requirement that a and m should have no common divisor results in the condition that m should be a multiple of 4, i.e., $m = M(4)$.

For the translation of the write/read head a number of possibilities will be described in a similar way as for $n > 1$.

1. CIRCULAR TRACKS

A. Group counter. Each time after m groups have been counted a translation is effected over one track distance.

R. Revolution counter. Each time after a revolutions have been counted a translation is effected over one track distance.

2. SPIRAL TRACK

A. Group counter

A.1. $m = M(1)$. Upon each count of the group counter which for the first time is greater than a multiple of $m/a$ a translation is effected over one track distance. Example: $m = 10$, $a = 3$, hence $m/a = 10/3$. As a result, a translation takes place at the counter positions 4 (4 > 10/3) and 7 (7 > 20/3). A.2. $m \neq M(1)$. In this case a set of m groups is not divided over one track circumference before proceeding with the next set of groups. Instead a set of Nm groups is each time divided over N track circumferences, N being selected so that $Nm = M(1)$. Upon each count of the counter which for the first time is greater than a multiple of $Nm/a$ a translation takes place over N track distances.

B. Revolution counter.

$m = M(1)$. Upon each count a translation takes place over one track distance, except for the highest count a.

Above an embodiment of the system in accordance with the invention is described which is suitable for recording one information signal on the record carrier. However, the system in accordance with the invention is equally suitable for substantially smultaneously recording a multiplicity of information signals on the record carrier. When x information signals are recorded these are always recorded in sets of x groups, each group of such a set belonging to one of the x information signals.

Figure 3B:
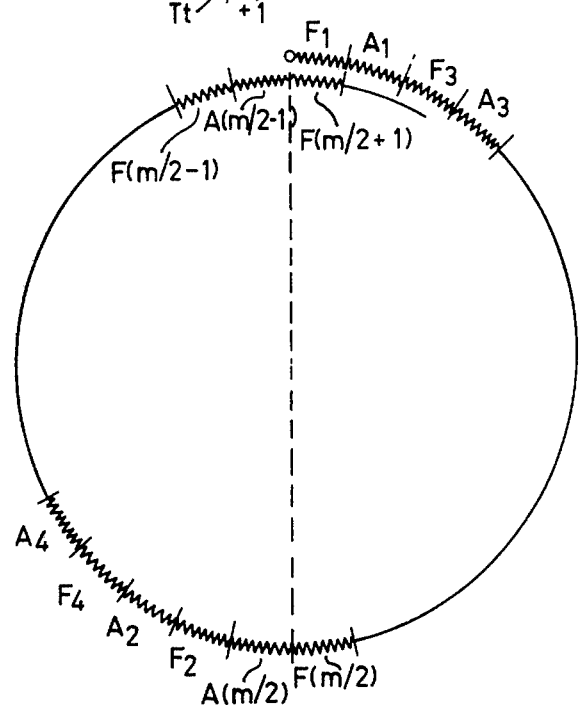

In order to explain this FIG. 3b by way of example shows a division of the groups in the case that two information signals F and A are recorded in a spiral track and the time interval $\tau_t = a/m\, T$, where $a = \frac{1}{2}m + 1$. This Figure clearly shows the division into sets of two groups ($F_1$, $A_1$: $F_2$, $A_2$ etc).

The requirements with which the system parameters should comply and the necessary translations may be derived in a similar way as is done hereinbefore in the case that one information signal is to be recorded. Since recording always takes place in sets of x groups, a should first of all be a multiple of x, i.e. $a = M(x)$. Hereinafter, the requirements for the system paremeters will first be derived for the case that n is greater than 1, i.e.

$$\tau_t = nT = NT + \frac{a}{m} T \qquad (11)$$

The requirement that not a single set of groups per track circumference should coincide with a preceding set then yields the following set of requirements:

$$NT + \frac{a}{m} T \neq M(T) \qquad (12)$$

$$2(NT + \frac{a}{m} T) \neq M(T)$$

$$(\frac{m}{x} - 1)(NT + \frac{a}{m} T) \neq M(T)$$

It follows that:

$$a \neq M(m) \qquad \frac{a}{x} \neq M(\frac{m}{x}) \qquad (13)$$

$$a \neq M(\frac{1}{2} m) \quad \text{or} \quad \frac{a}{x} \neq M(\frac{1}{2} \frac{m}{x})$$

$$a \neq M(\frac{1}{\frac{m}{x} - 1} m) \qquad \frac{a}{x} \neq M(\frac{1}{\frac{m}{x} - 1} \cdot \frac{m}{x})$$

This last set of requirements entirely corresponds to that in accordance with formula (7) and consequently implies that $a/x$ and $m/x$ should have no common divisor.

In the case of a circular track m should again be a multiple of x, so that $m = M(x)$ In the case of a spiral track this need not necessarily be so, but mN groups may be divider over N track circumferences, in which case $mN = M(x)$ and $a/x$ and $mN/x$ should have no common divisor.

The necessary translational movements may again be classified as follows.

1. CIRCULAR TRACKS

A. Group counter. Translation over one track distance each time after m have been counted.

B. Revolution counter. Translation over one track distance each time after $1/x (mN + a)$ revolutions have been counted.

2. SPIRAL TRACK

A. Group counter. A.1. $a = x$. Each time after counting x groups a translation is effected over N track distances. A.2. $a \neq x$ and $m = M(x)$. A translation is effected at each count which is a multiple of x. For these counts which for the first time aregreater than a muliple of $m/a$ x, this translation is N + 1 track distances, for the other counts it is N track distances. A.3. $a \neq x$, $m \neq M(x)$. A translation is effected upon each count which is a multiple of x. At these counts, which for the first time are greater than a multiple of $N m/a$ x the translation is 2N track distances, for the other counts it is N track distances.

Revolution counter. B.1. $a = x$, $m = M(x)$. A translation over one track distance is effected upon each count of the counter, except for one of the highest counts between $$\left\{N(\frac{m}{x} - 1) + 1\right\} \text{ and } \left\{N\frac{m}{x} + 1.\right\}$$

It is alternatively possible to effect a translation over N track distances upon each count which is a multiple of N, except for one of the highest counts N $2m/x$ and $N(N m/x + 1)$. B.2. $a \neq x$, $m = M(x)$. For each count of the counter a translation is effected over one track distance, except for one of the highest counts between $$\left\{N(\frac{m}{x} - 1) + \frac{a}{x}\right\} \text{ and } \left\{N\frac{m}{x} + \frac{a}{x}\right\}.$$

If n is selected smaller than 1, i.e.

$$\tau_t = \frac{a}{m} T \qquad (14)$$

it follows again that $a/x$ and $m/x$ should have no common divisor. For the examle illustrated in FIG. 3b, where $a = \frac{1}{2}m + 1$ and two information signals are to be recorded, it follows that for $a = M(x)$ and $m = M(x)$ this requirement can only be met for $m = M(4) - 2$.

The possibilities as regards the necessary translational movement are again as follows.

1. CIRCULAR TRACK

A. Group counter. Each time after m groups have been counted, a translation is effected over one track distance.

B. Revolution counter. Each time after $a/x$ revolutions have been counted a translation is effected over one track distance.

2. SPIRAL TRACK

A. Group counter A.1. $m = m(x)$. A translation over one track distance is effected only at a count which is a multiple of x, viz. only for those counts which for the first time are greater than a multiple of $x$ $m/a$. Example: $m = 24$, $x = 3$, $a = 9$, so that $xm/a = 24/3 = 8$; translation at the counts 9 (98) and 18(1816). A.2. $m \neq M(x)$. Again a set of Nm groups is divided over N track circumferences, while $Nm = M(x)$. A translation over N track distances is effected only at a count which is a muliple of x, i.e. only for those counts which for the first time are greater than a multiple of $Nm/a$ x.

B. Revolution counter. $m = M(x)$. For each count a translation is effected over one track distance, except for the highest count $a/x$.

Figure 4:
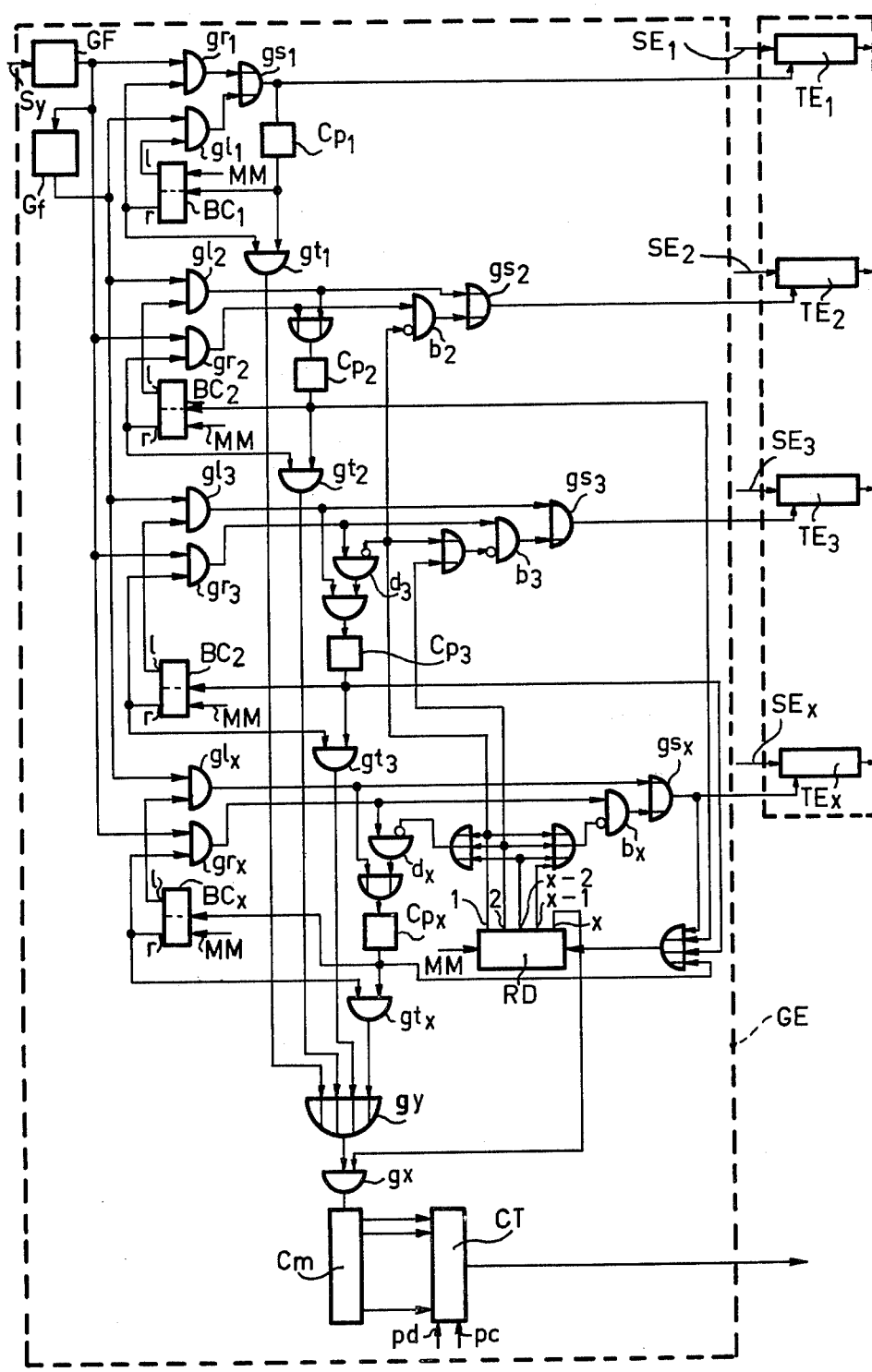
FIG. 4 shows an embodiment of a recording apparatus for the substantially simultaneous recording of $x$ information signals.

FIG. 4 schematically shows the recording apparatus required for substantially simultaneously recording x information signals. This recording apparatus now comprises x signal circuits $TE_1$ through $TE_x$, to which the individual information signals $SE_1$ through $SE_x$ are applied and whose outputs are connected to the write/read head.

The control circuit GE is essentially of the same design as the control circuit shown in FIG. 1, but is now adapted so that a correct recording sequence is obtained for the x information signals. For this purpose, the control circuit comprises the following elements:

The generator GF for supplying the pulse train with a repetition frequency F.

The generator GF for supplying the pulse train with a repetition frequency $f$.

Sample counters $Cp_1$ through $Cp_x$ for determining the duration of the read-in period and the readout period of the memories included in the signal circuits $TE_1$ through $TE_x$.

Bistables $BC_1$ through $BC_x$ for switching from the read-in period to the read-out period and vice versa.

A number of logic gates as indicated for mutually arranging the read-in and read-out periods of the signal circuits $TE_1$ through $TE_x$. These inter alia include the blocking gates $b_2$ through $b_x$ in the connections between the generator GF and the signal circuits $TE_2$ through $TE_x$ and the blocking gates $d_3$ through $d_x$ in the connections between his generator GD and the sample counters $Cp_3$ through $Cp_x$.

A group counter Cm for counting the number of groups recorded.

The control unit CT for controlling the translation of the write/read head.

A start register RD with x outputs, of which each time only one output supplies a logic 1, which register is advanced one step by each pulse at its input and which is blocked in its highest position.

The operation of this recording apparatus is as follows:

Upon starting a pulse MM is formed by a suitable element, for example, a flip-flop.

This pulse MM sets the flip-flop BC1 to the position in which its output 1 supplies a logic 1 and the other flip-flops $BC_2$ through $BC_x$ to the states in which their outputs r supply a logic 1.

Moreover, this pulse MM sets the start register RD to position 1, so that the output 1 supplies a logic 1.

As a result of this, the AND-gate $gl_1$ transfers the pulse train from the generator Gf to the signal circuit $TE_1$, so that the information $SE_1$ is sampled. Moreover, this pulse train is applied to the sample counter $Cp_1$. The blocking gates $b_2$ through $b_x$ are all blocked owing to the position of the start register RD and since all AND-gates $gl_2$ through $gl_x$ are also blocked for the pulse train of the frequency f which is applied to their inputs, the signal circuits $TE_2$ through $TE_x$ will receive no clock signal.

The sample counter $Cp_2$ receives the pulse train of the frequency F via the AND-gate $gr_2$, while the other sample counters $Cp_3$ through $Cp_x$ receive no pulses, because both the AND-gates $gl_3$ through $gl_x$ and the blocking gates $d_3$ through $d_x$ are blocked.

When the sample counter $Cp_2$ has counted p pulses, which corresponds to a time interval $p \tau_F \leqq \tau_f$, the following changes take place.

Flip-flop $BC_2$ is set to the position in which its output 1 supplies a logic 1. As a result of this, the AND-gate $gl_2$ transfers pulses of the frequency $f$ to the signal circuit $TE_2$ as a clock signal, so that samples of the information signal $SE_2$ are stored in the memory.

The start register RD is advanced one step, so that its output 2 supplies a logic 1, and its output 1 a logic 0. As a result of this, the blocking gate $b_2$ is opened, so that the section of the control circuit destined for the signal circuit $TE_2$ further operates as an independent unit, because all blocking operations controlled by the start register are cancelled. Moreover, because the logic 1 at the output 1 of the start register RC ceases to appear, the blocking gate $d_3$ is opened, so that the pulse train of the frequency F is applied to the sample counter $Cp_3$.

When this sample counter $Cp_3$ has again counted p samples, the flip-flop $BC_3$ changed over and the start register RD is again advanced one step. As a result of this, the section destined for the signal circuit $TE_3$ can further operate as an independent unit, and the sample counter $Cp_4$ starts counting the pulses.

This process is repeated until consecutively all signal circuits $TE_1$ through $TE_x$ have taken up samples of the corresponding information signal, after which all control sections further determine the read-in and read-out periods of the signal circuits, independently of each other, but of course with the mutual relationship described under the starting cycle.

The group counter Cm does not receive any pulses until the starting cycle has been completed. This is accomplished with the aid of an AND-gate gx, which is both connected to the output x of the start register RD., and to the output of an OR-gate gy. This OR-gate receives pulses from the group counters $Cp_1$ through $Cp_x$ via the AND-gates $gt_1$ through $gt_x$ each time after termination of a read-period from the corresponding signal circuits $TE_1$ through $TE_x$, but these pulses are not transferred by the AND-gate gx until the output x of the start register supplies a logic 1, i.e. after the starting cycle. The group counter Cm then controls the control unit Ct, which controls the translation of the write/read head depending on the selected system parameters. In the Figure the dependence of this control unit on the system parameters is represented by the control inputs pd and pc.

The reproducing apparatus is largely identical to this recording apparatus. Only few points of difference can be indicated. The starting pulse MM now sets all flip-flops BC, i.e. also $BC_1$, to the position in which their outputs r supply logic 1. This starting pulse MM will generally be taken from the record carrier and indicate the position in which for example a first group of samples of the first of information signal is recorded.

When the start register RD is advanced by the pulses from the sample counters $Cp_1$ through $Cp_2$ the clocking gates $b_2$ through $b_x$ and $d_3$ through $d_x$ are opened in this order, so that consecutively the groups of information signals $SE_1$ through $SE_x$ are read into the signal circuits $TR_1$ through $TR_x$, which now take the place of the signal circuits $TE_1$ through $TE_x$.

In the reproducing apparatus the AND-gate gx may be dispensed with, because each pulse at the output of the OR-gate now always indicates the completion of a read-out operation of a group, also during the starting cycle.

It is to be noted that in this embodiment of the reproducing apparatus the first set of x groups after the starting pulse MM will not be reproduced correctly. The counter $Cp_2$ will receive the pulse train F directly after the beginning of the starting cycle and after counting p pulses it will change over the flip-flop $BC_2$. Subsequently, the counter $Cp_2$ will receive the pulse train f and after counting p pulses it will change over the flip-flop $BC_2$ again, so that the pulse train F is applied to the signal circuit $TE_2$ as as clock signal via the blocking gate $d_2$ which is then open, so that the second information group $SE_2$ is read out. Consequently, the first group is not read out, because during the appearance of this first group at the input of the signal circuit $TE_2$ the clock signal F was not present. The same also applies to the signal circuits $TE_3$ through $TE_x$.

When audio information is reproduced this will generally present no problem, because this disturbance at the beginning of the read-out process is only of very short duration, namely the duration of the starting cycle. However, when for example telemetry signals are reproduced, this may present a problem. This can then be eliminated in various manners. A simple method is for example to include blocking gates in the connections between the counters $Cp_2$ to $Cp_x$ and the flip-flops $BC_2$ through $BC_x$, these blocking gates being controlled by the start register RD in a similar way as the blocking gates $D_2$ through $D_x$. With respect to the flip-flop $BC_2$ this ensures that the first pulse of the counter $Cp_1$ cannot change over this flip-flop $BC_2$. Thus, this counter $Cp_1$ still receives the pulse train F, which is now applied to the signal circuit $TE_2$, because the blocking gate $b_2$ has been opened by the first pulse from the counter $Cp_2$ via the start register RD. Thus, the first information group $SE_2$ is taken up the signal circuit $TE_2$. The operation of the device is further identical to that of the previously described device.

With respect to the embodiments of the device in accordance with the invention shown in FIGS. 1 and 4 it has already been stated that these are based on a time interval $\tau_i$ during which recording on the record carrier takes place, which time interval equals $p\,\tau_F$, so that $\tau_i = p\,\tau_F$. It has also been stated previously that it will generally be desired to record additional information, such as marking pulses and/or synchronizing pulses, in addition to these groups of information samples.

As an example the instantaneous angular velocity of the record carrier will not be entirely constant, inter alia owing to the eccentricities of this record carrier which are inevitable in practice. As a result of this, it may be desirable to add a synchronizing signal to each recorded group of information samples, for which purpose $\tau_i > p\,\tau_F$. Furthermore, it will generally be desirable to add a marking pulse to a first group.

Figure 5:
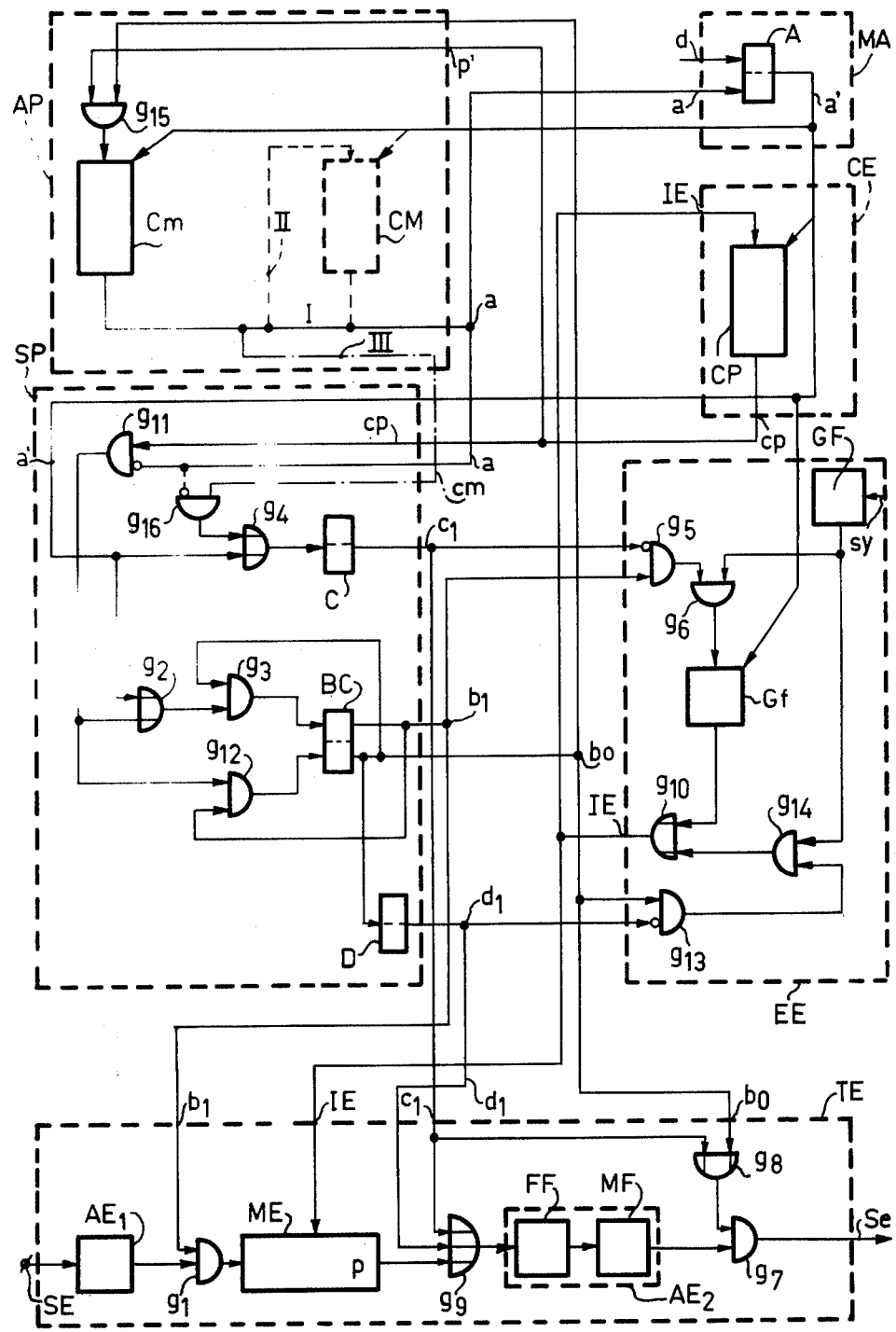

In the recording device in accordance with FIG. 5 and the reproducing device of FIG. 6 provisions have been made for the use of such marking and synchronizing signals when recording or reproducing a single information signal. Here, the sampling duration $\tau_t$ is assumed to be such, that a in formula (4) equals 1. First of all, the recording apparatus of FIG. 5 will be discussed. This recording apparatus comprises the signal circuit TE and the control circuit, which comprises the following five sections:

1. A circuit EE with the generator GF and the generator Gf which take the form of a divider stage, for producing pulse trains of the frequencies F and $f$.
2. A circuit CE with the sample counter Cp
3. A start-stop circuit MA.
4. A circuit AP with the group counter Cm.
5. A circuit SP which includes the flip-flop BC for defining the time division of a recording cycle.

When the recording apparatus is in the rest position the AND-gate $g_1$ is blocked for the information signal SE, because $b_1$ is the 0. When recording is started a short pulse d is applied to the flip-flop. A of the start-stop circuit MA, so that this flip-flop A changes over. As a result of this a transient pulse $a'$ is obtained at the output thereof, which has the following effect:

1. The counters Cp, Cm are set to their initial positions and the divider stage Gf is switched on.

2. The flipflop BC is set to position 1 via the OR-gate $g2$ and the AND-gate $g_3$, so that the signal $b_1$ (logic 1) is obtained.

3. The monostable C is set to its non-stable state via the OR-gate $g_4$, in which state the signal $C_1$ (logic 1) appears at its output.

At this stage of the process the gate $g_1$ of the circuit TE is opened by the presence of the signal $b_1$, but the information cannot yet be stored in the memory ME because the sampling pulses IE in the sampling circuit ME are blocked. Although the signal $b_1$ is present at the input of the gate $g_5$ of said circuit EE, which gate controls the transfer of the fast pulses of the frequency F obtained from GF to the frequency divider Gf via the AND-gate $g_6$, the signal $C_1$ blocks said gate $g_5$, while moreover the AND-gate $g_{14}$ is blocked by the signal $b_0$ via the gate $b_{13}$.

During the time $\tau_r$, that is in its non-stable state the monostable multivibrator C supplies a signal $c1$. This signal is employed to record a marker on the record carrier, which denotes either the beginning of the information on the record carrier or the zone of the carrier, which is taken as the beginning of the grooves. For this purpose the signal $c_1$ is both used for opening the AND-gate $g_7$ of the signal circuit TE via the OR-gate $g_8$, and is transferred to the write/read head via OR-gate $g_9$ and the adaptation circuit $AE_2$, which in the present instance comprises a low-pass filter FF (cut-off frequency F) and a modulator MF. The modulator MF for example converts said signal into a frequency which corresponds to the basic frequency of a synchronizing signal if frequency modulation is used during recording.

After the time interval $\tau_r$, the monostable multivibrator C returns to the stable state, so that the gate $g_5$ of the circuit EE supplies a logic 1, as a result of which $g_6$ opens and the frequency divider $G_f$ receives pulses from the generator GF. The divider is in fact a counter, whose number of positions equals the compression ratio $\tau_f/\tau_F$. As a result of this, it supplies pulses at the output with a repetition frequency $f$, which via the OR-gate $g_{10}$ are applied to the memory ME as a clock signal IE, so that the information SE is stored in the memory ME. Simultaneously, the pulses IE advance the counter Cp in the circuit CE.

After p pulses (which correspond to a sampling time p. $\tau_f = \tau_i$) the memory ME is full and contains the samples of one information group; the counter Cp then supplies a pulse cp.

This pulse cp ensures that the flip-flop BC is reset to position 0 via the gate $g_{11}$, which at this instant is not blocked because the signal a is not present, and the AND-gate $g_{12}$ which is opened by the signal $b_1$. The signal b which is then produced, sets the monostable multivibrator 0 of the circuit SP to its non-stable position.

At this stage of the process the output gate $g_7$ of the circuit TE is opened by the signal $b_o$, which is applied to this gate $g_7$ by the flip-flop BC via the gate $g_8$. However, the information group stored in the memory ME cannot be extracted from this memory, because the sampling pulses IE in the sampling circuit EE are blocked. Although the signal $b_o$ is present at the input of the gate $g_{13}$ of said circuit EE, which gate controls the direct transfer of the pulses of the frequency F obtained from GF via the AND-gate $g_{14}$ and the OR-gate $g_{10}$, the signal $d_1$ blocks said gate $g_{13}$, so that the AND-gate $g_{14}$ is blocked.

During the time that it is in its non-stable state the monostable multivibrator D supplies a signal $d_1$, which time will be referred to as $\tau'_s$ hereinafter. This signal is employed to add a synchronizing signal to each of the information groups. Hence, it is necessarily included in the time $\tau_i$, whose length is limited by the basic characteristics of the system in accordance with the invention. For the specified choice of the system parameters the following should apply:

$$m\tau_i + \tau_r = T, \text{ with}$$

$m$ being an integer $$\tau_i = T'_s + p \cdot \tau_F$$

As a result, the signal $d_1$ is transferred to the write/read head via the OR-gate $g_9$, the adaptation circuit $AE_2$, and the gate $g_7$ which is then open.

After the time interval $\tau'_s$ the monostable multivibrator D returns to the stable state; the pulse train of the frequency F obtained from GF, is transferred as a clock signal IE to the memory ME via the OR-gate $g_{10}$ and the AND-gate $g_{14}$, which is opened because the gate $g_{13}$ can transfer the signal $b_o$ as a result of the blocking signal $d_1$ having disappeared.

At this stage the clock signal IE ensures that the information group which was stored in the memory ME is read out, which is then recorded on the record carrier via the adaptation circuit $AE_2$ and the gate $g_7$ which has been opened by the signal $b_0$.

The pulses IE simultaneously advance the counter Cp. After $p$ pulses, i.e. after a sampling time p. $\tau_F$, the counter Cp again supplies a pulse $cp$, which causes the flip-flop BC to return to position 1 via the gate $g_{11}$ which is still open, the OR-gate $g_2$, and the AND-gate $g_3$, which is still open owing to the signal $b_o$. The gate $g_6$ is opened by the presence of a signal $b_1$, which is transferred via the gate $g_5$, so that a clock signal IE of a frequency $f$ appears. Moreover, the gate $g_1$ is opened by the presence of said signal $b_1$, so that the second information group SE is read into the memory ME. After this read-in of $p$ samples the pulses $cp$, which is supplied by the counter $Cp$, causes the flip-flop BC to return to position O, as described hereinbefore. This results in the multivibrator D being set to the non-stable state, and thus a synchronizing signal being recorded in addition to the first information group which has been recorded, and subsequently, after the multivibrator D has returned to the stable state, the second information group stored in the memory ME being recorded. These cycles are repeated in an identical manner for the subsequent groups.

The circuit AP, which includes the counter Cm has already been mentioned hereinbefore. Its function is to control the translation of the write/read head when the recorded information groups are counted (advancing said counter under control of pulses cp which are supplied by the sample counter Cp each time after $p$ samples have been counted and which are transferred via the AND-gate $g_{15}$, which is opened by the signal $b_o$), so that this circuit AP may be considered a control circuit. The counter Cm has m positions, for example a number of positions equal to the number of information groups recorded in one track circumference of the record carrier. Said counter moreover ensures that the process is stopped depending on the duration of the information to be recorded. Moreover, a certain freedom as regards the choice of the system parameters is obtained, because the duration of the information recorded on one track circumference equals $m \cdot \tau_i$ and because $m$ vary as a function of the duration selected for the synchronizing signal. If the total duration d of the information is selected to equal $Nm(T + 1)$, the output of the counter Cm may directly be used (line I) as a stop pulse $a$, which resets the multivibrator A to the zero position and which moreover blocks the gate $g_{11}$. If $d$ is selected to equal a multiple of $Nm(T + 1)$ a second counter CM is required, which receives a pulse from the counter Cm and which supplies a pulse as a stop pulse a at the count $$M = \frac{d}{Nm(T + 1)}.$$

This embodiment is represented by the dashed line II.

If the carrier has circular grooves, an additional step is necessary in the last mentioned embodiment in the case that the reproducing section is as shown in FIG. 6. This step, which is indicated by a dash-dot line III in FIG. 5, consists in the multivibrator C, again being set to the non-stable state by the output pulse cm from the counter Cm via CR-gate $g_4$ and the gate $g_{16}$ (except if the counter CM supplies the pulse a after counting), which results in a signal being recorded which marks the beginning of each track which is to be used for recording the information.

FIG. 6 shows the corresponding reproducing apparatus, assuming that the record carrier has circular tracks and the parameter N equals 1. For illustration FIG. 7 shows a part of such a track. At the point where recording in this track begins a marking signal (duration $\tau_r$), followed by a synchronizing signal (duration $\tau_s$) is recorded, together represented by the signal $rs_1$. After this a first group of samples $t_1$ follows. Each subsequent group of samples $t_2$ through $t_m$ is also preceded by a synchronizing signal $S_2$ through $S_m$.

The reproducing apparatus of FIG. 6 comprises
1. The signal circuit TR.
2. A circuit EE for supplying the clock signal for this signal circuit.
3. A circuit SP for controlling the read-out cycles.
4. A circuit MA for starting and stopping said cycles.

In contradistinction to the reproducing apparatus in accordance with FIG. 1, the read-in and and read-out periods of the memory MR in the signal circuit are not programmed by counting the samples (as in the recording section), but with the aid of the snychronizing signals.

For extracting the marking and synchronizing signals the signal circuit TR include a separator stage S to which the read-out signal which is demodulated with the aid of a demodulator DF is applied. This separator stage S supplies a first signal $rs_1$ of a duration $\tau_r + \tau_s$ in accordance with the marking pulse and synchronizing pulse $rs_1$ in FIG. 7. Simultaneously, this separator stage S supplies the synchronizing signals $S_1$ through $S_m$. The first synchronizing signal is derived from the signal $rs_1$ by producing a pulse $S_1$ after a time interval $\tau_r$ after the beginning of this signal $rs_1$. This separator stage may for example comprise two parallel circuits, one circuit including a differentiator, and can thus supply a pulse at the beginning of each synchronizing or marking signal, while the second circuit includes an integrator which can only supply an output signal which is sufficiently large for producing a pulse if the time interval of the applied input pulse is greter than $\tau_s$. This integrator consequently supplies the masking signal $rs_1$. Finally, the separator stage S supplies the read-out information signal $sr$, which is for example transferred to the memory MR via a low-pass filter FF.

The marking pulse $rs_1$ which is extracted by the separator stage S is applied to a phase comparator circuit $C_\phi$ in the circuit ER, and its phase is compared with that of the pulses which via a divider stage DV are derived from the pulse train of the frequency F, with which the generator GF is synchronized.

In the rest position the information signal sr is blocked in the signal circuit TR by the AND-gate $g_{24}$ which takes the form of a switch for analog signals. In order to start the reproducing cycle a short starting pulse $d$ is applied to the bistable multivibrator $A_1$ of the start-stop circuit MA via the OR-gate $g_{30}$. The output signal $a_1$ (logic 1) of the multivibrator $A_1$ is applied to the AND-gate $g_{29}$ of the circuit ER via the OR-gate $g_{25}$, so that the pulse train $f$ from the divider stage $G_f$ is applied to the memory MR as a clock signal. However, this clock signal has no effect, because the memory MR is still empty.

The subsequent marking pulse $rs_1$ now produces a pulse $rz$ in the stop-start circuit MA via the AND-gate $g_{31}$. As a result of this pulse $rz$:

1. The bistable multivibrator $A_2$ is set to position 1 via the blocking gate $g_{32}$ which is open at this instant, and supplies the output signal $a_2$ (logic 1).

2. The counting circuits $Cs$ and $Cm$ of the circuit SP are set to position 1.

The end on the pulse $rz$ sets the flip-flip $A_1$ to position O, so that the signal $a_1$ and thus the clock signal IE of the frequency f disappears.

The counters $Cs$ and $Cm$ have an equal number of counting positions ($m$), equal to the number of groups in one track circumference of the record carrier. If the two counters are at the same counting position, the circuit supplies a signal cr (logic 1). Since the pulse $rz$ has set the two counters $Cs$ and $Cm$ to position 1, the circuit will supply the signal $cr$. The signal cr causes the AND-gate $g28$ of the sampling circuit ER to transfer the pulse train F from the generator GF, because the AND-gate $g_{27}$ now receives a logic 1 at both inputs. This pulse train F is transferred to the signal circuit TR as a clock signal IE for the memory ME via the OR-gate $g_{26}$. Furthermore, the AND-gate $g_{24}$ opens via the AND-gate $g_{22}$ and the blocking gate $g_{23}$, which has been opened by the marking pulse $rs_1$ via the bistable multivibrator B, so that the first information group of the read-out information sr is stored in the memory MR.

At the instant that the first information group has been completely read into the memory MR the separator stage S supplies the synchronizing pulse $S_2$ (see FIG. 7), so that the counter $Cs$ is advanced one step. The comparator circuit $Cr$ detects an inequality of the counting positions of the counters $Cs$ and $Cm$, so that er becomes zero and $cr$, which has been derived from cr with the aid of the inverter I, becomes 1. Since the signal cr becomes zerom the gate $g_{28}$ of the sampling circuit ER and the gate $g_{24}$ of the signal circuit TR are blocked. The signal $cr$ opens the gate $g_{29}$ of the sampling circuit ER, so that the pulse train $f$ is applied to the memory MR as a clock signal IE, so that the samples contained therein are read out with this frequency $f$ and via the hold circuit M and the filter Ff supply the output signal SR.

During the reproducing cycle which is started by the starting pulse $d$, the separator stage S further supplies the synchronizing signals $S_3$ through $S_m$ in this order. As a result, the counter $Cs$ is each time advanced, so that the signal $cr$ is maintained. After one revolution of the record carrier the marking pulse $rs_1$ appears again, so that the counter $Cm$ is set from position 1 to the position 2. Simultaneously with this marking pulse $rs_1$ the synchronizing pulse $S_1$ appears, which sets the counter Cs, which was full after the synchronizing pulse Sm, to the counting position 1. If subsequently the second synchronizing pulse $S_2$ is read out, this counter $Cs$ is set to the counting position 2 and, as the counting positions of the two counters $Cs$ and $Cm$ are then equal, the signal $Cr$ is supplied at this instant. In a similar way as described for the first information group, this signal causes the second information group to be read into the memory MR and the samples stored in this memory to be read out.

In a similar way the subsequent information groups are read out. At the instant that during the $(m-1)$th revolution of the record carrier the synchronizing pulse Sm appears, the read-in of the $(m-1)$th information group in the memory MR will be terminated, and the read-out of the stored samples of this information group will be started. The next marking pulse $rs_1$ sets the counter $Cs$ to the counting position 1, while the counting $Cm$ has now arrived at the counting position m. As a result of this, the $m^{th}$ information group is read into the memory MR after appearance of the synchronizing pulse Sm. After this information group has been stored in the memory MR the separator stage S supplies the marking pulse $rs_1$, which now sets the two counters $Cs$ and $Cm$ to the counting position 1. This would result in the signal or being maintained. However, at this stage, as was the case with the preceding groups, the signal $cr$ should occur. In order to achieve this, the counter Cm supplies a pulse a at the transition from the counting position $m$ to the counting position 1. This pulse a sets the flip-flop $A_2$ to position O, so that the signal $a_2$ becomes zero as a result of which the gate $g_{24}$ in the signal circuit TR is blocked and the gate $g_{28}$ in the sampling circuit ER is also blocked. Thus, it is no longer possible to store information in the memory MR. Moreover, this pulse a sets the multivibrator $A_1$ to position 1, so that the signal $a_1$ appears, which causes the gate $g_{29}$ in the sampling circuit ER to be blocked and the pulse train f to be applied to the memory MR as a clock signal IE for reading out the stored samples, after which the read-out of the relevant track circumference is completed.

The next marking pulse $rs_1$, in a similar way as the marking pulse which marked the beginning of the read-out, now forms the pulse $rz$ via the gate $g_{31}$ of the start-stop circuit MA, so that the two counters $Cs$ and $Cm$ remain in the counting position 1 and the first information group of a following track is stored in the memory MR by the formation of the signal $cr$. it is obvious that after the complete scanning of the preceding track the write/read head should have performed as translational movement, for which purpose the pulse a from the counter $Cm$ may be used. This translation of course depends on the track geometry and the recording method, as has been described comprehensively hereinbefore.

The circuit SP in FIG. 6, in addition to the counters Cs and Cm and the comparator CR, also includes a circuit CM, which is activated by the starting pulse $d$. Depending on the recorded information this circuit may take different forms. If this information is recorded in more than one track, it may be a counter whose number of positions corresponds to the number of tracks plus one. However, if the information is recorded in only one track, it may simply be constituted by a bistable multivibrator. Assuming that this circuit CM is a counter, this counter is set to the counting position 1 by the starting pulse d and by every pulse a from the counter Cm it is advanced one step.

As long as this counter CM has not yet reached the highest count, scanning of a following track is started after the complete scanning of a specific track. However, if the counter has reached the highest count, it supplies a signal cM, which blocks the gate $g_{32}$ of the start-stop circuit MA. The pulse rz which is formed on the appearance of a subsequent marking pulse $rs_1$ can then no longer set the multivibrator $A_2$ to position 1. This pulse rz resets the multivibrator $A_1$ to position 0, thus terminating the read-out process. Moreover, the signal CM may be applied to the multivibrator B in the signal circuit TR, as a result of which $g_{24}$ is blocked.

Finally, the function and firm of the hold circuit M in the signal circuit TR will be described. As is shown in the Figure, this hold circuit M receives a control signal mn from the gate $g_{23}$, i.e. during reading of an information group into the memory MR. FIG. 8 shows an embodiment of this hold circuit, which includes an input amplifier $Am_1$ an output amplifier $Am_2$, a blocking gate $g_{70}$ and a capacitor C. Normally, the signal se which is read out of the memory MR is transferred as the signal ss via the amplifier $Am_1$, the gate $g_{70}$ and the amplifier $Am_2$, which signal ss is applied to the filter Ff (FIG. 6). When the output impedance of the amplifier $Am_1$ is sufficiently low, the effect of the capacitor C is negligible. If the signal mn is present during the storage of an information group in the memory MR, the gate $g_{70}$ is blocked and ensures that the signal SS remains equal to the last value stored in the capacitor C. This ensures that the signal ss is disturbed to the least possible extent by the read-out procedure which is used. The gate $g_{70}$ may of course simply be formed by a field-effect transistor which receives the signal mn at its control electrode.

It is to be noted that although hereinbefore only the recording and reproduction of audio information has been discussed the invention is also eminently suited for a combination of audio and video information. In the case of a record carrier with circular tracks a video picture may then be recorded in one track and an accompanying audio signal in one or more adjacent tracks. The audio and video information can then be read with two separate read heads. It is also possible to use one head for read-out, which head normally scans the track on which the video information is recorded, which head is briefly moved to an adjacent track for the read-out of a group of audio information. This is then accompanied by a short interruption of the video signal which can then be compensated for in respect of the video content with the aid of for example a delay line as is shown for video signals.

What is claimed is:

1. A method of recording and reproducing x information signals, wherein x is an integer, on a disc-shaped record carrier driven at a substantially constant speed of revolution V in cooperation with a read/write head, comprising dividing each of the information signals during reading into consecutive information segments of equal duration $\tau_i$, sampling each information segment and storing the sampled information in a first memory with a first clock frequency f, said first clock frequency being at least twice the highest frequency of the information signals, reading the stored information signals out of the first memory and recording the stored information on the record carrier at a second clock frequency F that is higher than the first clock frequency f, playing back the recorded material onto a second memory at the frequency F, and reading the material out of the second memory at a frequency f, synchronizing the two clock frequencies f and F relative to the speed of revolution V of the record, the magnitude of the frequencies f and F and the magnitude of the period $\tau_i$ of the information segments being selected in such a way that $\tau_i < F/f^2$, and that for the time interval $t_i$ during which each information segment is recorded on the carrier the expression $t f/F < t_i < 1/f$ is valid.

2. A method as claimed in claim 1 wherein the magnitude of the first clock frequency f is a multiple of (xV).

3. A method as claimed in claim 2, wherein the duration $\tau_i$ of one information segment satisfies the equation $\tau_i = N\ 1/V + a/m\ 1/V$, N being an integer with the inclusion of zero, a being a multiple of x which is smaller than m, and $m = f/V$ being the number of groups per track circumference and also being a multiple of x, while the parameters a and m are selected so that $a/x$ and $m/x$ have no common divisor.

4. A method as claimed in claim 3, wherein the translation control unit is controlled by a group counter which during recording counts the number of groups already recorded in one track circumference, and during reproduction counts the number of groups already read out of one track circumference, and which depending on the choice of the parameters supplies command signals to the translation control unit at specific counts, so as to cause a translation of the write or read head.

5. A method as claimed in claim 4, wherein when a record with circular tracks is used the group counter supplies a command signal each time after m groups are counted, and the translation control unit in response to said command signal causes a translation of the write or read head over one track distance.

6. A method as claimed in claim 4, wherein when a record carrier with a spiral track is used and the parameters $a = x$ and $N \neq 0$ are chosen, the group counter supplies a command signal each time after counting a number of groups which is a multiple of x, and the translation control unit in response to said command signal causes a translation of the write or read head over N track distances.

7. A method as claimed in claim 4, wherein when a record carrier with a spiral track is used and the parameter $a \neq x$ is chosen, a first command signal is supplied for those counts which for the first time are greater than a multiple of $(m/a\ x)$ and a second command signal is provided for the other counts, and wherein the translation control unit in response to the first command signal causes a translation of the write or read head over $(N+1)$ track distances, and in response to the second command signal causes a translation over N track distances.

8. A method as claimed in claim 3, wherein the translation control unit is controlled by a revolution counter, which counts the number of revolutions of the record carrier after the beginning of the recording or read-out of one track circumference, and depending on the choice of the parameters supplies command signals to the translation control unit at specific counts, so as to cause a translation of the write or read head.

9. A method as claimed in claim 8, wherein when a record carrier with circular tracks is used the revolution counter supplies a command signal each time after $\{1/x (mN + a)\}$ revolutions, and the translation control unit causes a translation of the write or read head over one track distance in response to this command signal.

10. A method as claimed in claim 8, wherein when a record carrier with a spiral track is used the revolution counter supplies a command signal upon each count of the counter except for one of the highest counts between $$\left\{N(\frac{m}{x} - 1) + \frac{a}{x}\right\} \text{ and } \left\{N\frac{m}{x} + \frac{a}{x}\right\},$$

and the translation control unit in response to this command signal effects a translation of the write or read head over one track distance.

11. A method as claimed in claim 1 wherein the read-in and read-out intervals for the memory during the time compression during recording and the time expansion during the reproduction, are defined with the aid of a counter which counts the number of periods of the active clock frequency and renders the other clock frequency effective each time after a specific count.

12. A method as claimed in claim 1, wherein during recording a synchronizing signal is added to each information group.

13. A method as claimed in claim 12, wherein a marking signal is added to each first group which is recorded on a track circumference.

14. A method as claimed in claim 13, wherein during reproduction the marking signal is used for synchronizing the two clock frequencies.

15. A method as claimed in claim 13, wherein during reproduction the read-in and read-out intervals for the memory during time expansion are defined with the aid of the marking signal and the synchronizing signals.

16. An apparatus for recording and reproducing $x$ information signals, where $x$ is an integer, on a disc-shaped record carrier, comprising means for driving the record carrier at a substantially constant speed of revolution V, a read/write head cooperating with the record carrier and with said driving means, means for dividing each of the information signals during recording into consecutive information segments of equal duration $\tau_t$, first clock frequency generator means for providing a first clock frequency signal $f$, said frequency $f$ being at least twice the highest frequency of the information signals, a first memory, means connected to said information signals and to said first clock frequency generator means for sampling said information signals at the frequency $f$ and for writing the sampled information signals into the first memory, second clock frequency generator means for providing a second clock frequency signal F that is higher than the first clock frequency $f$, means for reading the sampled information signals from said first memory and for recording the sampled information signals from the first memory onto the record carrier with said second clock frequency signal F, means for synchronizing the first and second clock frequency generators $f$ and F relative to the speed of revolution of the record, the magnitude of the frequencies f and F and the magnitude of the period $\tau_t$ of the information segments being selected in such a way that $\tau_t \leq F/f^2$, and wherein a time interval $\tau_i$ during which each information segment is recorded on the carrier the expression $\tau_t f/F \leq \tau_i \leq 1/f$ is valid.

17. Apparatus as claimed in claim 16, for each information unit the recording and reproducing apparatus is provided with a signal circuit with a memory for effecting the time compression and time expansion respectively, a control circuit for defining the read-in and read-out intervals of this memory in the signal circuit, and a translation control unit for controlling the translation of the write or read head.

18. Apparatus as claimed in claim 17, wherein the control circuit is provided with
 a gate circuit for transferring either the first or the second clock signal to the memory in the signal circuit;
 a sample counter for counting the number of periods of the active clock signal and supplying an output pulse when a specific fixed count is reached;
 a bistable multivibrator which is controlled by the sample counter and which changes over upon each output pulse of said sample counter and which in its turn controls the gate circuit $(gl, gr)$;
 a gate, a group counter coupled via said gate to the sample counter and the multivibrator, and each time after a group has been recorded or reproduced recieving a pulse and a control signal to the translation control unit.

19. Apparatus as claimed in claim 18, wherein the recording apparatus and reproducing apparatus each comprise a start register, which cooperates with the control circuits and which defines the time sequence of the recorded groups of x information signals.

20. Apparatus as claimed in claim 19, wherein the start register is controlled by the sample counters included in the control circuits, and co-operates with blocking gates included in said control circuits.

21. Apparatus as claimed in claim 17, wherein the reproducing apparatus is provided with a first counter to which extracted marking signals are applied, a second counter to which additional extracted synchronizing signals are applied, a comparator circuit which compares the counts of the first and the second counter with each other and supplies a first logic signal when these counts are equal, and a gate circuit which is controlled by said comparator circuit which is adapted to supply the clock signal of the frequency F to the signal circuit upon the appearance of this first logic signal.

* * * * *